March 3, 1942.  H. M. SHERIDAN ET AL  2,275,327

TOOL HOLDER

Filed Feb. 12, 1941

INVENTORS
HENRY M. SHERIDAN
OLE SEVERSON

BY Albert Sperry
attorney.

Patented Mar. 3, 1942

2,275,327

UNITED STATES PATENT OFFICE 2,275,327

TOOL HOLDER

Henry M. Sheridan, Erie, Pa., and Ole Severson, Shelton, Conn., assignors to The Apex Tool & Cutter Company, Inc., a corporation of Connecticut Application February 12, 1941, Serial No. 378,538

3 Claims. (Cl. 29—97)

This invention relates to tool holders and particularly tool holders for metal cutting machines such as lathes, planers, formers, boring mills or the like.

Tool holders embodying the present invention may be variously formed to obtain the objects of the invention but preferably are provided with two tool holding portions or segments adapted for independently receiving and holding tool bits or cutting blades. Preferably also the holder is formed to permit relative adjustment of the tool bits without removing the tool bits from the holder.

With this construction a single tool holder may be provided with a plurality of cutting blades or tool bits which may be used alternatively or together to perform the desired cutting operations. Thus for example, one portion or segment of the tool may be provided with a right hand tool bit and the other with a left hand tool bit to perform alternative operations. The tool may also be adjusted without removing the tool bits therefrom so as to rough out a key way or slot and thereafter by adjustment to finish the slot to exact dimensions. In a similar way, the dimensions may be adjusted to compensate for the greater wear and chipping of one tool bit than another so as to maintain predetermined dimensions without removing the tool bits from the holders.

Another important feature of the invention resides in means for locking tool bits within the holder in various predetermined positions.

One of the objects of the invention is to provide an inserted blade tool holder adapted to properly hold a plurality of cutting blades or tool bits.

Another important object of the invention is to provide a single tool holder which will properly hold both a right hand and a left hand tool bit so that they may be alternately employed during the operation of a machine without requiring any change or adjustment of either holder or bit.

Another object of the invention is to provide in a tool holder for a plurality of tools means for adjusting the relation of one tool bit to another without adjustment or removal of the bits from the holder.

Another object of the invention is to provide in a tool holder an adjustable tool bit locating means or stop which may be preset prior to the insertion of the tool bit and which will thereupon insure the proper amount of projection of the cutting edge from the holder.

Other more general objects of the invention include the provision of a novel simple inexpensive tool holder which provides for the rigid securement of one or more tool bits therein.

Other objects, advantages and features of the invention will be apparent from a consideration of the following specification taken in conjunction with the accompanying drawing in which.

Figure 1:
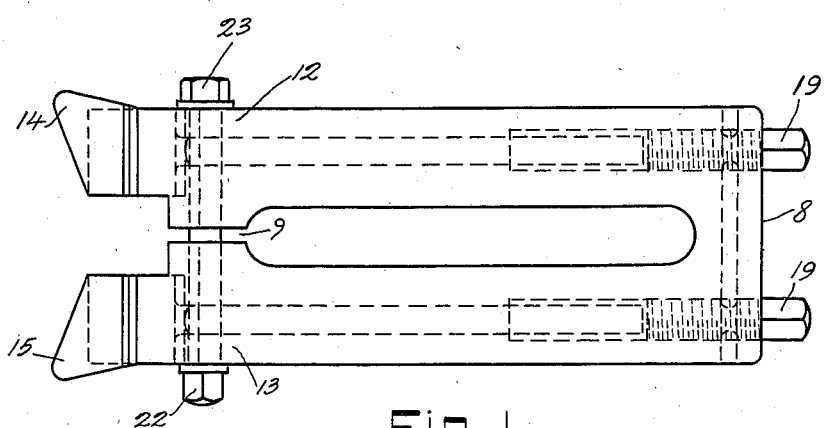
Fig. 1 is a front elevation of one preferred form of the invention.
Figure 2:
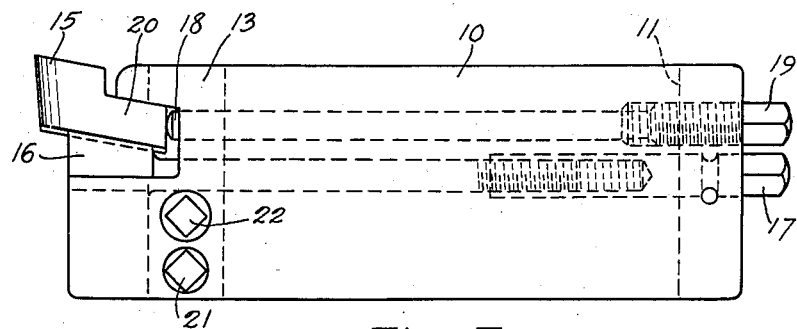
Fig. 2 is a side elevation of that form of the invention shown in Fig. 1.
Figure 3:
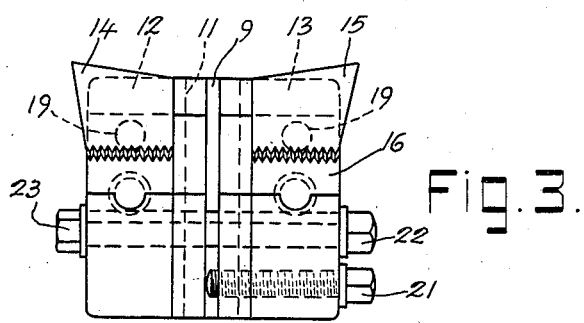
Fig. 3 is an end elevation of the invention as illustrated in Figs. 1 and 2.

While the shape and construction of tool holders embodying the present invention is capable of wide variations a preferred form of the invention shown in the figures of the drawing includes, a body generally indicated at 10 and formed with a central opening 11 through which may be passed bolts for securing the holder to the tool posts of a machine such as a lathe, planer, former boring mill or the like. The right hand end of the slot 11 as shown in Fig. 1 is closed by the connected portion 8 of the holder while the left hand end of the slot is extended as indicated at 9 so that the holder has a generally U shaped or bifurcated form and includes a segment or portion 12 forming one leg of the body and a second segment or portion 13 forming the opposite leg of the body.

Each of the segments 12 and 13 is provided with independent means for securing a tool bit to the segment. The means illustrated are similar to those disclosed in Patent No. 2,063,129, but it will be understood that any suitable type of locking means may be employed on each of the segments of the holder. As illustrated the segment 12 is provided with a right hand tool bit or cutter 14 and the segment 13 is provided with a left hand tool bit or cutter 15. These bits are held in place by adjustable locking wedges 16 which are longitudinally movable by means of an adjustment screw 17 and bear against the lower face of the shank 20 of the tool bit.

Each segment of the tool preferably is provided with an adjustable abutment means or stops which engage the rear end of the shank 20 of the tool bit to determine the extension of the tool bit into the bit receiving recess in the end of the segment. The abutment means 18 is adjustable longitudinally of the segment by the screw 19 to accurately locate the end of the shank 20 of the tool bit when the bit is secured in place in the segment.

In order to provide adjustment between the segments 12 and 13 and in order to secure the segments against displacement after adjustment is made, there is provided an adjustable segment stop screw 21 extending transversely through one segment in which it is threaded and bearing against the opposite segment. The adjusting bolt 22 extends through both segments being secured to one and having a threaded connection with an adjusting nut 23 rotatably secured in the opposite segment. Thus, by adjusting the stop 21 to set the position of the relative segments and manipulation of the nut 23 the segments may be securely locked in the desired relationship. It will be obvious that by adjustment of stop 21 and nut 23 the relationship may be varied without disturbing the securement of the tool bits with respect to their segments.

In the practice of the present invention it will be understood that numerous changes, modifications and the full use of equivalents may be resorted to without departure from the spirit or scope of the invention as outlined in the appended claims.

Having set forth the nature of our invention, what we claim is:

1. In a tool holder, a bifurcated body portion and means in each furcation thereof for securing a tool bit therein and means for adjusting the relationship of said furcations, said last-mentioned means being operable independent of said first-mentioned means.

2. In a tool holder, a bifurcated body portion and means in each furcation thereof for securing a tool bit therein and means for adjusting the relationship of said furcations, said last-mentioned means being operable independent of said first-mentioned means and said first-mentioned means being operable independent of said last-mentioned means.

3. In a tool holder, an elongated body, one end of said body being split longitudinally to provide a pair of segments, means in each segment for securing a tool bit therein, each of said means being independent of the other and means for adjusting the spacing between said segments.

HENRY M. SHERIDAN.
OLE SEVERSON.